United States Patent
Tanada et al.

(10) Patent No.: US 6,671,015 B2
(45) Date of Patent: Dec. 30, 2003

(54) TRANSFLECTIVE LIQUID CRYSTAL DISPLAY WITH BACKLIGHT AND REFLECTION FILM

(75) Inventors: Tetsushi Tanada, Fukushima-ken (JP); Mitsuo Ohizumi, Fukushima-ken (JP); Mitsuru Kano, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/953,999

(22) Filed: Sep. 17, 2001

(65) Prior Publication Data

US 2002/0054257 A1 May 9, 2002

(30) Foreign Application Priority Data

Sep. 18, 2000 (JP) ........................................ 2000-282623

(51) Int. Cl.⁷ ............................................. G02F 1/1335
(52) U.S. Cl. ...................................... 349/113; 349/114
(58) Field of Search ................................. 349/113, 114

(56) References Cited

U.S. PATENT DOCUMENTS

| | | | | |
|---|---|---|---|---|
| 5,396,350 A | * | 3/1995 | Beeson et al. | 349/62 |
| 5,753,937 A | | 5/1998 | Shimomaki et al. | |
| 6,130,736 A | * | 10/2000 | Sasaki et al. | 349/122 |
| 6,342,935 B1 | * | 1/2002 | Jang et al. | 349/113 |
| 6,380,995 B1 | * | 4/2002 | Kim | 349/113 |
| 6,421,106 B1 | * | 7/2002 | Takatsuka et al. | 349/113 |
| 6,456,347 B1 | * | 9/2002 | Motomura et al. | 349/117 |
| 2002/0041356 A1 | * | 4/2002 | Tanada et al. | 349/158 |

FOREIGN PATENT DOCUMENTS

| | | | | |
|---|---|---|---|---|
| EP | 0 973 058 A1 | | 1/2000 | |
| EP | 0973058 | * | 1/2000 | ......... G02F/1/1335 |
| JP | 10-312165 | | 11/1993 | |
| JP | 9-197399 | | 7/1997 | |
| JP | 11-14809 | | 1/1999 | |
| JP | 11242105 | * | 7/1999 | ............ G02B/5/08 |
| WO | WO 97/01788 | | 1/1997 | |

* cited by examiner

Primary Examiner—Robert H. Kim
Assistant Examiner—Jeanne A. Di Grazio
(74) Attorney, Agent, or Firm—Brinks Hofer Gilson & Lione (57) ABSTRACT

A liquid crystal display includes a pair of substrates which oppose each other with a liquid crystal layer therebetween; a light source provided on the exterior of one of the substrates; and at least an organic film, a metallic reflection film, an overcoat film, an electrode layer, and an alignment film formed on the inner face of one of the substrates. Many concave portions are contiguously formed on a surface of the organic film, the inner surface of each concave portion constituting a part of a spherical surface. The metallic reflection film has a thickness of 80 to 500 Å. A transflector and a liquid crystal display including the transflector are also disclosed.

2 Claims, 5 Drawing Sheets

TRANSFLECTIVE LIQUID CRYSTAL
DISPLAY WITH BACKLIGHT AND
REFLECTION FILM

BACKGROUND OF THE INVENTION

1. Field of the Invention

The present invention relates to liquid crystal displays and, more particularly, to a technique suitable for use in a transflective liquid crystal display provided with a backlight and a reflection film.

2. Description of the Related Art

Substantially all mobile phones and mobile information terminals are now provided with liquid crystal displays, and recently, many such mobile electronic apparatuses have been provided with transflective liquid crystal displays.

In general, a transflective liquid crystal display includes a reflector provided on the interior or exterior of a pair of transparent substrates for reflecting incident light from outside and also includes a backlight at the back side thereof. The transflective liquid crystal display can be used as a reflective liquid crystal display and as a transmissive liquid crystal display by switching between a reflective mode in which solar light or an external illumination is used as a light source and a transmissive mode in which light from the backlight is used as a light source.

Figure 5:
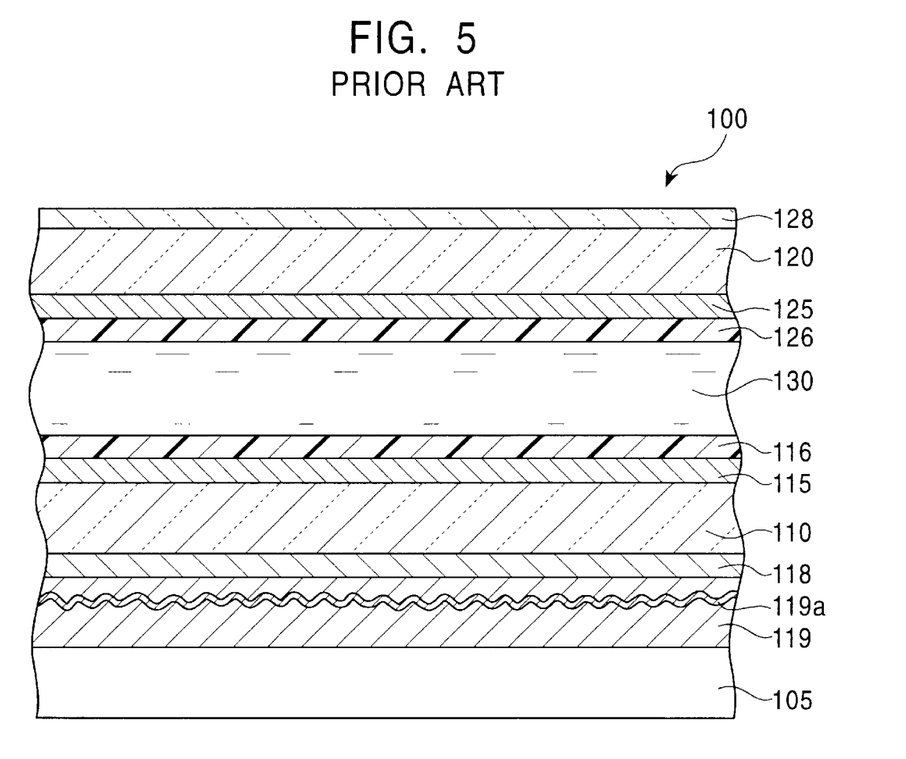
FIG. 5 is a partial sectional view showing a conventional liquid crystal display.

FIG. 5 is a partial sectional view of a conventional transflective liquid crystal display. In a conventional transflective liquid crystal display 100 shown in the drawing, a first substrate 110 and a second substrate 120, which are composed of a transparent material, such as glass, are opposed to each other, and a liquid crystal layer 130 is enclosed therebetween.

An electrode layer 115 and an alignment film 116 are deposited in that order on a surface of the first substrate 110 facing the liquid crystal layer 130. An electrode layer 125 and an alignment film 126 are deposited in that order on a surface of the second substrate 120 facing the liquid crystal layer 130.

A polarizer 118 is provided on another surface of the first substrate 110 opposite to the liquid crystal layer 130 (i.e., the outer surface of the substrate 110), and a reflector 119 having a reflection film 119a composed of a metal is provided on the outer surface thereof such that the reflection film 119a faces the polarizer 118. A polarizer 128 is provided on the outer surface of the second substrate 120. A backlight 105 for transmissive display is provided on the back of the liquid crystal display 100.

The transflective liquid crystal display 100 having the structure described above is used, for example, as a display area of a mobile phone. When there is sufficient external light, the transflective liquid crystal display 100 operates in the reflective mode in which the backlight 105 is off, and in an environment where there is insufficient external light, it operates in the transmissive mode in which the backlight 105 is on.

However, in the transflective liquid crystal display 100, since the reflector 119 is placed on the exterior of the substrate 110, light entering the liquid crystal display 100 from outside must pass through two substrates, 110 and 120, and two polarizers, 118 and 128, before being reflected by the reflector 119. Therefore, the propagation loss of light is increased, and it is not possible to obtain satisfactory brightness when the transflective liquid crystal display 100 is used as a reflective liquid crystal display.

On the other hand, in the transmissive mode in which the liquid crystal display 100 is used as a transmissive liquid crystal display, although the reflector 119 must transmit light from the backlight 105, the thickness of the reflection film 119a is usually set at 1,000 to 1,500 Å in order to increase the reflectance of light. That is, pores are made in the reflection film 119a in order to transmit light.

However, in the method in which light from the backlight 105 is transmitted by providing the pores in the reflection film 119a, if the aperture ratio of the pores of the reflection film 119a is increased, the reflectance of the reflection film 119a is decreased, thereby decreasing brightness in the reflective mode. Therefore, it is not possible to sufficiently increase the aperture ratio, and satisfactorily bright display is not obtained when the backlight 105 is lit.

In order to solve the problems described above, a structure is disclosed, in which a reflector is placed between two substrates constituting a liquid crystal display so that the number of layers of substrates and polarizers through which light passes before reaching the reflector is decreased, and, by suppressing the propagation loss of light in the reflective mode, brighter reflective display can be obtained. By using such a structure, since display brightness in the reflective mode is ensured where possible, it is believed that brightness in the transmissive mode can be increased by decreasing the thickness of the reflection film for reflecting light to approximately 300 Å, but brightness in the reflective mode is slightly sacrificed.

However, even if such a structure is used, although the display brightness in the transmissive mode is improved, the brightness in the reflective mode is the same as that of the liquid crystal display 100. If the thickness of the reflection film is increased to a certain degree by giving a high priority to the brightness in the reflective mode, the brightness in the transmissive mode becomes insufficient.

As described above, a transflective liquid crystal display in which satisfactorily bright, easily visible display is performed both in the reflective mode and in the transmissive mode has not yet been produced.

SUMMARY OF THE INVENTION

It is an object of the present invention to provide a transflective liquid crystal display in which a bright display is obtained by efficiently reflecting light in the reflective mode, and also in which bright display is obtained by satisfactorily transmitting light in the transmissive mode in which a backlight is lit. It is another object of the present invention to provide a transflector which is suitable for use in such a liquid crystal display.

In one aspect of the present invention, a liquid crystal display includes a pair of substrates which oppose each other with a liquid crystal layer therebetween, and a light source provided on the exterior of one of the substrates. At least an organic film, a metallic reflection film, an overcoat film, an electrode layer, and an alignment film are formed on the inner face of one of the substrates. Many concave portions are contiguously formed on a surface of the organic film, the inner surface of each concave portion constituting a part of a spherical surface, and the metallic reflection film has a thickness of 80 to 500 Å.

In the construction of the present invention described above, since many concave portions are contiguously formed on the surface of the organic film provided with the reflection film for reflecting light entering the liquid crystal display from outside, the inner surface of each concave portion constituting a part of a spherical surface, it is possible to greatly improve the reflection efficiency of light in comparison to the conventional transflective liquid crystal display. Therefore, it is possible to improve the transmittance of the liquid crystal display by decreasing the thickness of the metallic reflection film so that a bright display is also obtained for the transmissive liquid crystal display. Consequently, a bright display can be obtained both in the reflective mode and in the transmissive mode. Moreover, since bright display is enabled in the reflective mode, it is not necessary to turn on the backlight even when the liquid crystal display is used in a slightly dark environment. Consequently, power consumption can be reduced in an electronic apparatus provided with the liquid crystal display of the present invention.

In the liquid crystal display, preferably, the metallic reflection film has a thickness of 80 to 100 Å.

In such a construction, since the transmittance of the liquid crystal display can be improved by decreasing the thickness of the metallic reflection film, it is possible to obtain a liquid crystal display exhibiting superior visibility. Moreover, since the liquid crystal display of the present invention has superior transmittance, it is possible to decrease the amount of light of the backlight required. Consequently, in the liquid crystal display of the present invention, it is possible to reduce the power consumption of the backlight which constitutes the majority of the power consumption of an electronic apparatus provided with the liquid crystal display of the present invention.

In the liquid crystal display, preferably, the depth of the concave portions is in the range of 0.1 to 3 $\mu$m, the inclination angle of the inner surface of each concave portion is in the range of −30 degrees to +30 degrees, and the pitch of the adjoining concave portions is in the range of 5 to 50 $\mu$m.

In such a construction, since the surface configuration of the organic film is optimized, incident light from outside is more efficiently reflected, and thereby brighter display can be obtained.

In another aspect of the present invention, a transflector includes a reflection layer, the reflection layer including a metallic film deposited on a surface thereof, many concave portions being contiguously formed on the surface, the inner surface of each concave portion constituting a part of a spherical surface. The depth of the concave portions is in the range of 0.1 to 3 $\mu$m, the inclination angle of the inner surface of each concave portion is in the range of −30 degrees to +30 degrees, the pitch of the adjoining concave portions is in the range of 5 to 50 $\mu$m, and the thickness of the metallic film is 80 to 500 Å.

In such a construction of the present invention, since the surface of the reflection layer can be formed into an optimum shape, light can be reflected more efficiently. By decreasing the thickness of the metallic film placed on the surface of the reflection layer to the value described above, transmittance can be improved. Consequently, in both cases when light is reflected and when light is transmitted, the transflector exhibits superior characteristics.

In another aspect of the present invention, a liquid crystal display includes the transflector described above.

In such a construction, it is possible to obtain a liquid crystal display having superior visibility in which bright display is obtained both in the reflective mode and in the transmissive mode.

DESCRIPTION OF THE PREFERRED EMBODIMENTS

The embodiments of the present invention will be described with reference to the drawings. However, it is to be understood that the present invention is not limited to the embodiments described below.

First Embodiment

Figure 1:
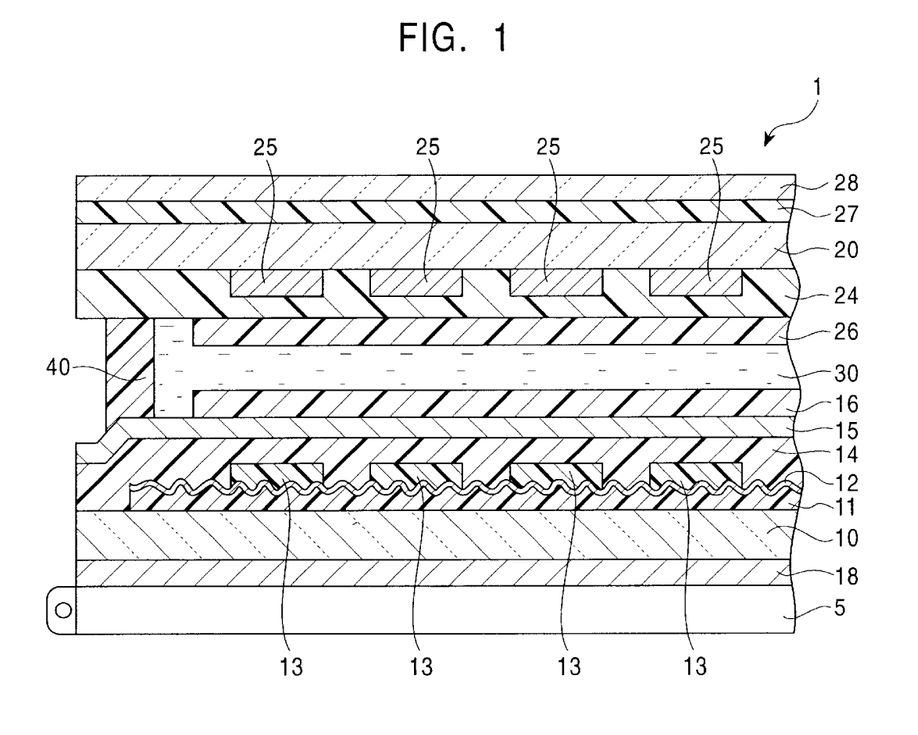
FIG. 1 is a partial sectional view of a liquid crystal display in a first embodiment of the present invention.

FIG. 1 is a partial sectional view which schematically shows a transflective liquid crystal display including an edge thereof in a first embodiment of the present invention. As shown in FIG. 1, in a transflective liquid crystal display 1, a first substrate 10 and a second substrate 20, for example, composed of a transparent glass, which oppose each other with a liquid crystal layer 30 therebetween, are integrally bonded to each other by a sealant 40 which is annularly provided in the periphery of the two substrates 10 and 20.

At the liquid crystal layer 30 side of the first substrate 10, an organic film 11 for corrugating a reflection film 12, a metallic reflection film 12 for reflecting light entering the liquid crystal display, color filters 13 for performing color display, an overcoat film 14 for protecting the organic film 11 and the metallic reflection film 12 as well as for planarizing the corrugation due to the organic film 11 and the color filters 13, electrode layers 15 for driving the liquid crystal layer 30, and an alignment film 16 for controlling the alignment of liquid crystal molecules constituting the liquid crystal layer 30 are deposited in that order. At the liquid crystal layer 30 side of the second substrate 20, electrode layers 25, an overcoat film 24, and an alignment film 26 are deposited in that order.

A polarizer 18 is provided at a side of the first substrate 10 opposite the liquid crystal layer 30 side (on the outer surface of the first substrate 10), and a retardation film 27 and a polarizer 28 are deposited in that order at a side of the second substrate 20 opposite the liquid crystal layer 30 side (on the outer surface of the second substrate 20).

A backlight 5, which acts as a light source for performing transmissive display in the transflective liquid crystal display 1, is provided on the outer surface of the polarizer 18 of the first substrate 10.

The organic film 11 corrugates the metallic reflection film 12 formed thereon so that reflected light is efficiently scattered. Since light entering the liquid crystal display 1 is efficiently scattered by corrugating the metallic reflection film 12, bright display is enabled in the reflective mode.

Figure 2:
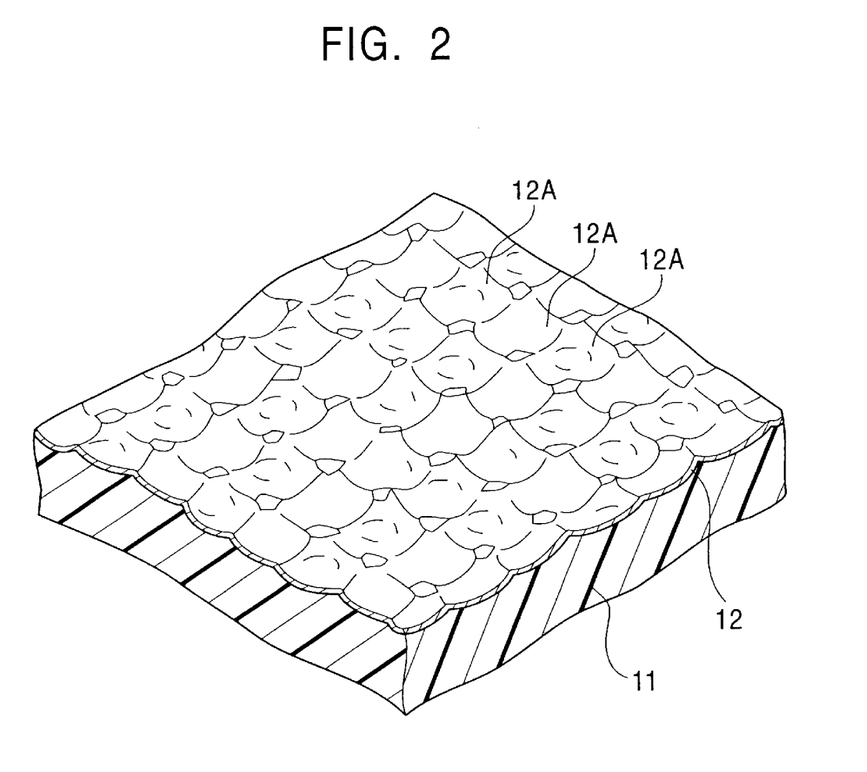
FIG. 2 is an enlarged perspective view showing a section including an organic film and a metallic reflection film in a liquid crystal display of the present invention.

FIG. 2 is a perspective view showing a section including the organic film 11 and the metallic reflection film 12 formed thereon. As shown in the drawing, concave portions 12A are contiguously formed on the surface of the organic film 11 such that they share a common edge, the inner surface of each concave portion constituting a part of a spherical surface, and the metallic reflection film 12 is deposited on the concave surface.

Preferably, the depth of the concave portions 12A is set at random in the range of 0.1 to 3 $\mu$m, the pitch of the adjoining concave portions 12A is set in the range of 5 to 50 μm, and the inclination angle of the inner surface of each concave portion 12A is in the range of −30 degrees to +30 degrees.

It is particularly important to set the inclination angle of the inner surface of each concave portion 12A in the range of −30 degrees to +30 degrees and to arrange the pitches of the adjoining concave portions 12A planarily at random in all directions. If the pitches of the adjoining concave portions 12A are regular, reflected light is colored due to interference colors of light, and this is disadvantageous. If the inclination angle of the inner surface of the concave portion 12A is out of the range of −30 degrees to +30 degrees, the diffusing angle of reflected light becomes excessively large to decrease the intensity of reflection, and thereby it is not possible to obtain bright display. This is because the diffusing angle of reflected light becomes 36 degrees or more in air and the peak of reflection intensity in the liquid crystal display is decreased, resulting in a large total reflection loss.

If the depth of the concave portions 12A exceeds 3 μm, when the concave portions 12A are planarized in the subsequent step, the apexes of convex portions will not be completely embedded in a planarizing film (overcoat film 14), and it is not possible to obtain desired flatness, resulting in display unevenness.

If the pitch of the adjoining concave portions 12A is less than 5 μm, constraints are imposed on the manufacture of a transfer mold used for forming the organic film 11, giving rise to problems, such as a considerably long processing time, not being able to form the shape which allows a desired reflection property, and the occurrence of interference of light waves. When a diamond indenter having a diameter of 30 to 100 μm, which can be practically used in practice for manufacturing the transfer mold, is used, the pitch of the adjoining concave portions 12A is preferably set at 5 to 50 μm.

A method for forming the organic film 11 will be briefly described with reference to FIG. 3.

Figure 3:
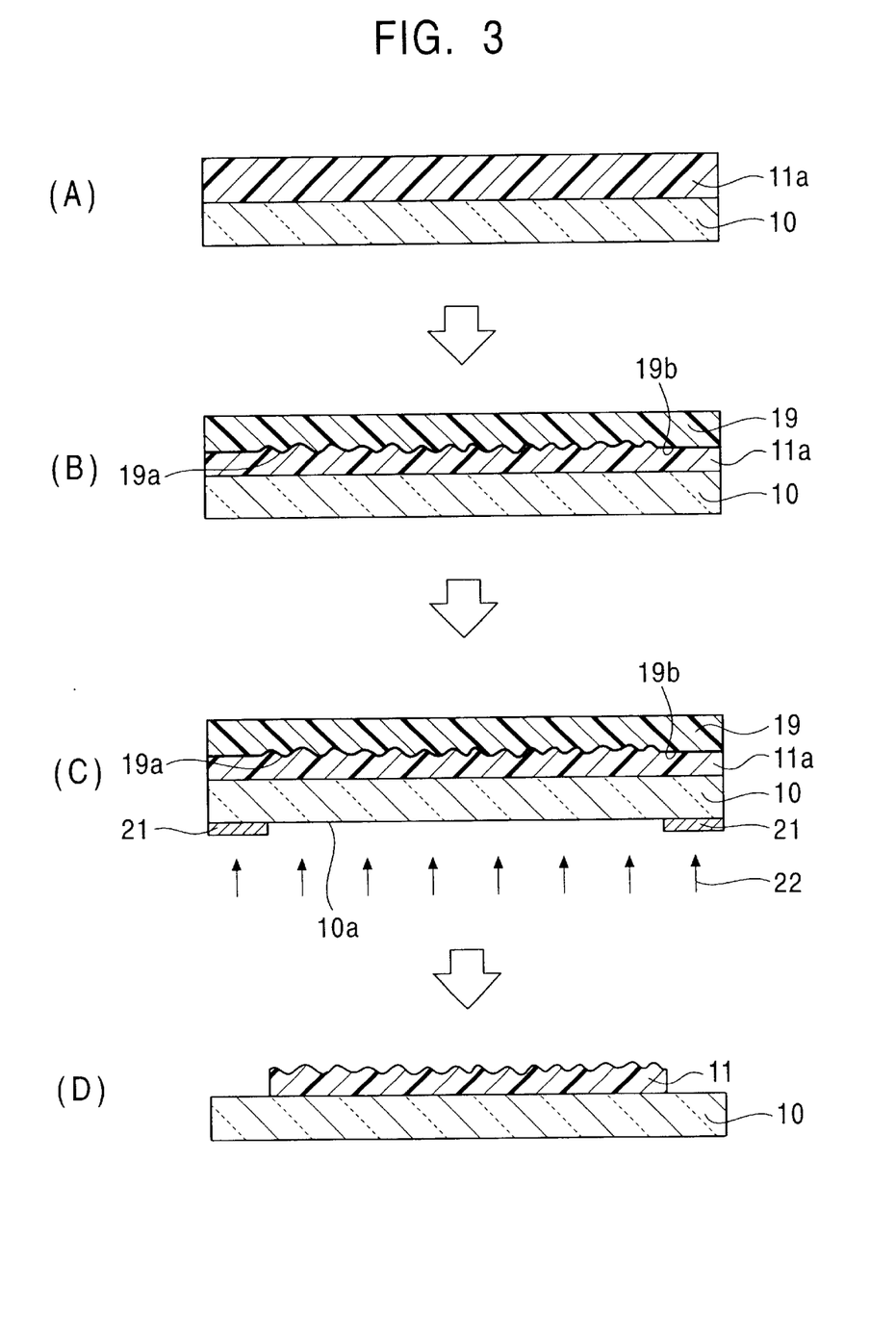
FIG. 3 is a sectional process chart which schematically shows a process for forming an organic film of a liquid crystal display of the present invention.

FIG. 3 is a process chart which schematically shows a process for forming the organic film 11 of the transflective liquid crystal display shown in FIG. 1 in this embodiment.

First, in step (A), a photosensitive resin solution, such as an acrylic resist, is applied on the first substrate 10 by spin coating or the like, and pre-baking is then performed to form a photosensitive resin layer 11a.

Next, in step (B), a transfer mold 19 which includes a corrugated surface 19a and a flat surface 19b in the periphery thereof is pressed against the surface of the photosensitive resin layer 11a so that the shape of the corrugated surface 19a of the transfer mold 19 is transferred to the surface of the photosensitive resin layer 11a.

Additionally, in order to manufacture the transfer mold 19, a diamond indenter is pressed to the surface of a base material for a matrix having a planar surface composed of brass, stainless steel, tool steel, or the like to form the surface configuration shown in FIG. 2, and thereby the matrix for transferring is formed. The transfer mold 19 is molded from a silicon resin or the like using the matrix for transferring. The transfer mold 19 has corrugation which is the reverse of the surface configuration of the concave portions 12A shown in FIG. 2.

Next, in step (C), a section corresponding to the flat surface 19b in the periphery of the transfer mold 19 on a back surface 10a of the first substrate 10 is covered by a photomask 21. The back surface 10a of the first substrate 10 is then irradiated with light 22, such as ultraviolet light (g-line, h-line, or i-line) so that the photosensitive resin layer 11a is cured.

In step (D), the photomask 21 is removed from the first substrate 10 and the transfer mold 19 is detached from the photosensitive resin layer 11a. At this stage, since the section corresponding to the flat surface 19b in the photosensitive resin layer 11a is masked by the photomask 21, it is not cured and is removed together with the transfer mold 19 when the transfer mold 19 is detached. Development, and rinsing using deionized water are performed, and firing is then performed using a heating medium, such as a heating oven, or a hot plate.

The organic film 11 having the corrugated surface is thereby formed on a predetermined region on the first substrate 10.

By forming the organic film 11 on the region excluding the periphery of the substrate 10, it is possible to cover the organic film 11 up to the edge by the overcoat film 14 to be formed later. Thereby, the organic film 11 is prevented from being brought into contact with outside air, and degradation of the organic film 11 due to moisture can be avoided.

The metallic reflection film 12 reflects/scatters light entering the liquid crystal layer 30 so that bright display is obtained, and is formed on the corrugation of the organic film 11. Preferably, the metallic reflection film 12 is composed of a metallic material having a high reflectance, such as Al or Ag. The metallic reflection film 12 may be formed by deposition, such as sputtering or vacuum deposition, using the metallic material.

Since the metallic material, such as Al or Ag, does not necessarily have good adhesion to the substrate 10 composed of glass, if a part of the metallic reflection film 12 is formed between the overcoat film 14 and the substrate 10, separation of the film may occur.

Therefore, when the metallic reflection film 12 is formed, preferably, the periphery of the substrate 10 in which the organic film 11 is not formed is covered by a mask, and the mask is removed after the metallic reflection film 12 is formed so that the film of the metallic material is not deposited on the first substrate 10.

Preferably, the metallic reflection film 12 has a thickness of 80 to 500 Å. If the thickness is less than 80 Å, display becomes darker in the reflective mode because the reflectance of light by the metallic reflection film 12 is too insignificant. If the thickness is larger than 500 Å, display becomes dark in the transmissive mode because the transmittance of the metallic reflection film 12 is decreased.

More preferably, the metallic reflection film 12 has a thickness of 80 to 200 Å. If the thickness of the metallic reflection film 12 is in such a range, since bright display is enabled in the transmissive mode, the difference in brightness between the transmissive mode and the reflective mode can be decreased. Therefore, when the transflective liquid crystal display is used by switching between the two operational modes, the visibility of the display can be improved.

Most preferably, the metallic reflection film 12 has a thickness of 80 to 100 Å (i.e., 90 Å±10 Å). In such a range, brightness in the reflective mode can be maintained and considerably superior brightness is enabled in the transmissive mode.

As described above, in the liquid crystal display 1 of the present invention, although the metallic reflection film 12 with a thickness which is considerably small compared to the conventional liquid crystal display is used, display can be performed with satisfactory brightness in the reflective mode, and because of the decrease in the thickness of the metallic reflection film 12, remarkably bright display is enabled in the transmissive mode compared to the conventional liquid crystal display.

The reason for the above is due to the surface configuration of the organic film 11 described above. That is, the reflectance itself of the metallic reflection film 12 is decreased if the thickness of the metallic reflection film 12 is decreased in order to increase the transmittance. However, bright display is enabled in the transmissive mode without greatly losing the display brightness in the reflective mode by forming concave portions contiguously on the surface of the organic film 11, the inner surface of each concave portion constituting a part of a spherical surface, so that the reflection efficiency of light by the metallic reflection film 12 is maximized.

In the liquid crystal display 1 of the present invention, if the thickness of the metallic reflection film 12 is set in the range of 80 to 100 Å, remarkably bright display is enabled in the transmissive mode. A bright display is achieved not only because of the improvement in transmittance due to a large decrease in the thickness of the metallic reflection film 12, but also because of the advantages of using the surface configuration of the organic film 11. That is, as shown in FIG. 2, since the inner surface of each concave portion 12A formed on the surface of the organic film 11 is spherical, the lens effect acts on light entering the organic film 11 from the substrate 10 side, and light from the backlight 5 passing through the organic film 11 is amplified, resulting in a remarkably bright display.

A plurality of strip electrode layers 15 composed of a transparent conductive film such as indium tin oxide (ITO) is arrayed on the overcoat film 14. The individual electrode layers 15 are connected to an external drive circuit (not shown in the drawing) and drives liquid crystal molecules constituting the liquid crystal layer 30. Similarly, a plurality of strip electrode layers 25 composed of a transparent conductive film such as ITO is arrayed on the substrate 20. The individual electrode layers 25 are connected to an external drive circuit. The electrode layers 15 and the electrode layers 25 are disposed so as to be orthogonal to each other when viewed from the top, and thus the liquid crystal display 1 is of a passive matrix type.

Although the liquid crystal display of the passive matrix type has been described above, the present invention is not limited thereto and is also applicable to a liquid crystal display of an active matrix type. In such a case, for example, after a transparent organic film having the surface configuration described above is formed above or below pixel electrodes constituting pixels, a metallic reflection film composed of Al, Ag, or the like is formed on the organic film at a thickness of 80 to 500 Å.

Second Embodiment

In the first embodiment, the metallic reflection film 12 for reflecting light entering from outside is disposed between the substrate 10 and the substrate 20. In contrast, in a second embodiment of the present invention, a reflector is provided on the exterior of two substrates which sandwich a liquid crystal layer.

Figure 4:
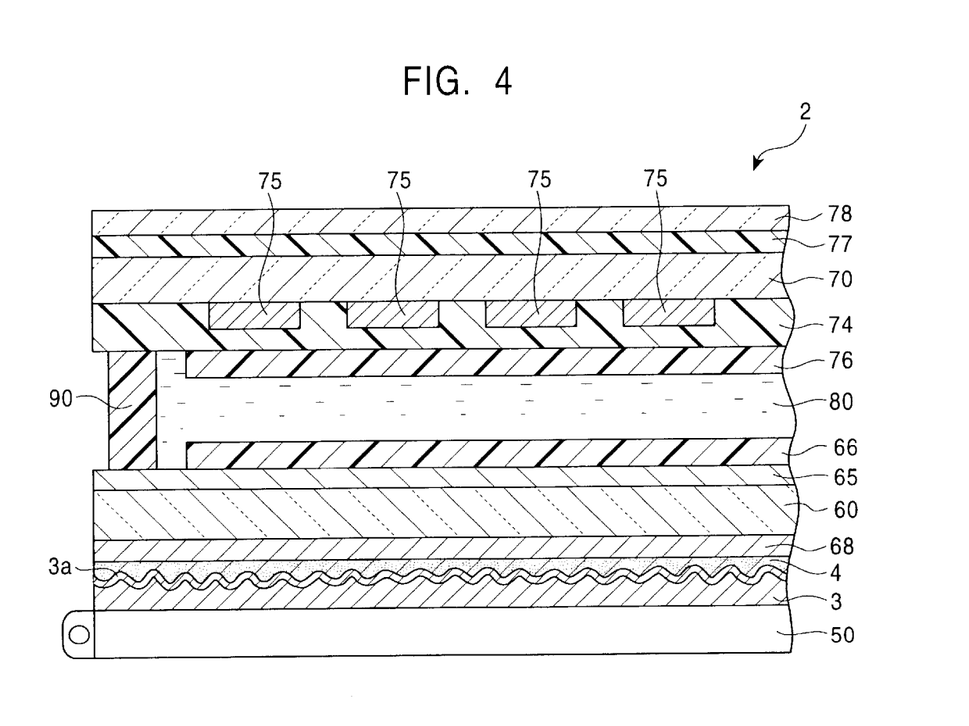
FIG. 4 is a partial sectional view of a liquid crystal display in a second embodiment of the present invention.

FIG. 4 is a partial sectional view which schematically shows a liquid crystal display 2 in the second embodiment of the present invention. As shown in FIG. 4, in the liquid crystal display 2, a first substrate 60 and a second substrate 70, for example, composed of a transparent glass, which oppose each other with a liquid crystal layer 80 therebetween, are integrally bonded to each other by a sealant 90 which is annularly provided in the periphery of the substrates 60 and 70.

At the liquid crystal layer 80 side of the first substrate 60, electrode layers 65 for driving the liquid crystal layer 80, and an alignment film 66 for controlling the alignment of liquid crystal molecules constituting the liquid crystal layer 80 are deposited. At the liquid crystal layer 80 side of the second substrate 70, electrode layers 75, an overcoat film 74, and an alignment film 76 are deposited in that order.

A polarizer 68 is provided at a side of the first substrate 60 opposite the liquid crystal layer 80 side (on the outer surface of the first substrate 60), and a retardation film 77 and a polarizer 78 are deposited in that order at a side of the second substrate 70 opposite the liquid crystal layer 80 side (on the outer surface of the second substrate 70).

A transflector 3 in accordance with the present invention is placed on the outer surface (lower surface) of the polarizer 68 of the first substrate 60 so that a reflection film 3a faces the polarizer 68. An adhesive 4 composed of a material which does not adversely affect the refractive index of light, such as glycerol, is filled between the polarizer 68 and the transflector 3.

Although not shown in the drawing, a color filter layers may be formed by printing or the like between the substrate 60 and the electrode layers 65 so that the liquid crystal display performs color display.

A backlight 50, which acts as a light source for performing transmissive display in the transflective liquid crystal display 2, is provided on the back of the transflective liquid crystal display 2 (at the outer surface of the first substrate 60).

The transflector 3 shown in FIG. 4 enables bright display and widens the angle of view by efficiently reflecting and diffusing incident light. In order to form the reflection film 3a, a surface configuration which is the same as that of the organic film 11 in the first embodiment shown in FIG. 2, (i.e., the configuration in which concaves 12 are contiguously formed, the inner surface of each concave constituting a part of a spherical surface), is transferred to the surface of a flat resin base (a base for the reflector) composed of a photosensitive resin or the like formed on a substrate composed of a transparent glass or the like, and a thin film composed of Al or Ag is deposited thereon by vapor deposition, printing, or the like.

Additionally, as a material for the substrate described above, a transparent material having a high transmittance, such as glass, may be used without problems, or a flexible film composed of a resin may be used. In some cases, the substrate may not be provided. Additionally, the transflector 3 can be fabricated by substantially the same method as that for the organic film 11 in the first embodiment shown in FIG. 3.

The surface configuration of the transflector 3 is the same as that for the organic film 11 shown in FIG. 2. Preferably, the depth of the concave portions formed on the surface of the transflector 3 is set at random in the range of 0.1 to 3 μm, the pitch of the adjoining concave portions is set at random in the range of 5 to 50 μm, and the inclination angle of the inner surface of each concave portion is set in the range of −30 degrees to +30 degrees. The reasons for this are the same as those described in the first embodiment. By forming the concave portions so as to satisfy the above conditions, the reflection efficiency of the transflector 3 can be increased.

The reflection film 3a is formed on the surface of the transflector 3, and it reflects and scatters incident light. The reflection film 3a preferably has a thickness of 80 to 500 Å, the same as the metallic reflection film 12 in the first embodiment. The reason for this is the same as that described in the first embodiment, and by setting the thickness in the above range, bright display is also enabled in the transmissive mode. In particular, if the thickness is set in the range of 80 to 100 Å (i.e., 90 Å+10 Å), remarkably bright display is enabled.

In the liquid crystal display 2 provided with the transflector 3 having the structure described above, the same as the liquid crystal display 1 in the first embodiment, brighter, more easily visible display is performed both in the reflective mode and in the transmissive mode compared to the conventional liquid crystal display. This is because of the improvement in the reflection efficiency of light due to the surface configuration of the transflector 3 and because of the improvement in transmittance due to a significantly small thickness of 80 to 300 Å of the reflection film 3a formed on the transflector 3.

Since the transflector 3 is an exterior type which is placed on the exterior of the substrates constituting the liquid crystal display, the transflector 3 can be mounted on a transmissive liquid crystal display without problems, and it is possible to produce a transflective liquid crystal display in which bright display is performed both in the reflective mode and in the transmissive mode. Therefore, by using the transflector 3 of the present invention, it is possible to manufacture a transflective liquid crystal display without changing the structure of the liquid crystal device except a reflector, thereby minimizing the cost for changing the manufacturing process.

Although the present invention is applied to a passive matrix liquid crystal display in the second embodiment, the present invention is also applicable to a three-terminal type (thin-film transistor: TFT) active matrix liquid crystal display and a two-terminal type active matrix liquid crystal display.

By applying the present invention to such active matrix liquid crystal displays, it is possible to obtain liquid crystal displays which provide a high-speed response and a wide angle of view and also satisfactory visibility in both cases when the backlight is on and when the backlight is off.

The present invention will be described in more detail based on the examples. However, it is to be understood that the present invention is not limited the examples described below.

EXAMPLE 1

An organic film composed of a photosensitive resin having a thickness of 2 μm was formed on a glass substrate with a thickness of 0.7 mm. An aluminum film, as a metallic reflection film, was deposited on the organic film at a thickness of 90 Å, and an overcoat film was deposited at a thickness of 300 Å so as to cover the organic film and the metallic reflection film. Electrode layers and an alignment film were deposited thereon in that order, and a substrate for a liquid crystal display was thereby prepared. With respect to the surface configuration of the organic film, concaves were formed on the surface of the organic film so as to satisfy the following conditions: the depth of the concave portions was in the range of 0.6 to 1.2 μm, the inner surface of each concave portion constituting a part of a spherical surface; the inclination angle of the inner surface of each concave portion was in the range of −8 degrees to +8 degrees; and the pitch of the adjoining concave portions was in the range of 26.5 to 36.5 μm.

The substrate for the liquid crystal display and a counter substrate provided with electrode layers, an alignment film, etc., which was prepared separately, were integrally bonded to each other by a sealant, and a liquid crystal was then injected between the two substrates. A backlight was placed on the exterior of the substrate for the liquid crystal display, and a transflective liquid crystal display was thereby fabricated.

EXAMPLES 2 TO 5

Transflective liquid crystal displays having the same structure as that of Example 1 were fabricated, except that aluminum films, as metallic reflection films, with the thicknesses described below were formed.

|  | Thickness of Reflection Film |
|---|---|
| EXAMPLE 2 | 100 Å |
| EXAMPLE 3 | 150 Å |
| EXAMPLE 4 | 200 Å |
| EXAMPLE 5 | 300 Å |

COMPARATIVE EXAMPLES 1 TO 3

Transflective liquid crystal displays having the same structure as that of Example 1 were fabricated, except that aluminum films as metallic reflection films with thicknesses described below were formed.

|  | Thickness of Reflection Film |
|---|---|
| COMPARATIVE EXAMPLE 1 | 75 Å |
| COMPARATIVE EXAMPLE 2 | 325 Å |
| COMPARATIVE EXAMPLE 3 | 1,000 Å |

EXAMPLE 6

An organic film composed of a photosensitive resin having a thickness of 2 μm was formed on a glass substrate with a thickness of 0.5 mm. Concave portions were formed on the surface of the organic film so as to satisfy the following conditions: the depth of the concave portions was in the range of 0.6 to 1.2 μm, the inner surface of each concave portion constituting a part of a spherical surface; the inclination angle of the inner surface of each concave portion was −8 degrees to +8 degrees; and the pitch of the adjoining concave portions was in the range of 26.5 to 36.5 μm. An aluminum film with a thickness of 90 Å, as a reflection film, was deposited on the organic film, and thereby a transflector was fabricated.

The transflector was bonded to the back of a transmissive liquid crystal display with an adhesive comprising glycerol therebetween so that the reflection film faced the liquid crystal display, and a backlight was placed on the outside of the transflector. A transflective liquid crystal display was thereby fabricated.

EXAMPLES 7 TO 10

Transflectors having the same structure as that of Example 6 and transflective liquid crystal displays using the transflectors were fabricated, except that aluminum films, as reflection films, with the thicknesses described below were formed.

|  | Thickness of Reflection Film |
|---|---|
| EXAMPLE 7 | 100 Å |
| EXAMPLE 8 | 150 Å |
| EXAMPLE 9 | 200 Å |
| EXAMPLE 10 | 300 Å |

COMPARATIVE EXAMPLES 4 TO 6

Transflectors having the same structure as that of Example 6 and transflective liquid crystal displays using the transflectors were fabricated, except that aluminum films, as reflection films, with thicknesses described below were formed.

|  | Thickness of Reflection Film |
|---|---|
| COMPARATIVE EXAMPLE 4 | 75 Å |
| COMPARATIVE EXAMPLE 5 | 325 Å |
| COMPARATIVE EXAMPLE 6 | 1,000 Å |

With respect to the transflective liquid crystal displays fabricated in Examples 1 to 10 and Comparative Examples 1 to 6, display brightness was evaluated both in the reflective mode in which the backlight was off and in the transmissive mode in which the backlight was on. The evaluation results were classified according to the four levels described below, and in addition to evaluations in the reflective mode and in the transmissive mode, comprehensive evaluations resulting therefrom were also made.

Evaluation Results

A Remarkably bright and easily visible

B Bright and easily visible

C Slightly dark

D Insufficiently bright but visible

First, with respect to the liquid crystal displays having reflection films inside in Examples 1 to 5 and Comparative Examples 1 to 3, the evaluation results are shown in a table below. As shown in the table, with respect to the liquid crystal displays in Examples 1 and 2, a remarkably bright and easily visible display was obtained both in the reflective mode and in the transmissive mode. With respect to the liquid crystal displays in Examples 3 to 5, brightness in the transmissive mode was slightly inferior compared to Examples 1 and 2, and accordingly, a decrease in visibility was observed. With respect to the liquid crystal display in which the thickness of the reflection film was 300 Å in Example 5, there was a difference in display brightness between the transmissive mode and the reflective mode, and although display brightness was sufficient for use, it was slightly difficult to see the display when the liquid crystal display was used while switching between the transmissive mode and the reflective mode. Additionally, with respect to the brightness in the transmissive mode in Examples 3 to 5, the liquid crystal display in Example 3 was brightest, the display in Example 5 was darkest, and brightness in Example 4 was between these two results.

In contrast, in the liquid crystal display in Comparative Example 1, display in the reflective mode was slightly dark, and in the liquid crystal display in Comparative Example 2, display in the transmissive mode was slightly dark, and therefore, display was significantly more difficult to see compared to the liquid crystal displays in Examples 1 to 5. In the liquid crystal display in Comparative Example 3, since substantially no light was transmitted, display in the transmissive mode was significantly inferior.

|  | Thickness of Reflection film | Evaluation of Reflection | Evaluation of Transmittance | Comprehensive Evaluation |
|---|---|---|---|---|
| Example 1 | 90 Å | A | A | A |
| Example 2 | 100 Å | A | A | A |
| Example 3 | 150 Å | A | B | B |
| Example 4 | 200 Å | A | B | B |
| Example 5 | 300 Å | A | B | B |
| Comparative Example 1 | 75 Å | C | A | C |
| Comparative Example 2 | 325 Å | A | C | C |
| Comparative Example 3 | 1,000 Å | A | D | D |

Next, with respect to the transflective liquid crystal displays provided with the transflectors on the exterior thereof in Examples 6 to 10 and Comparative Examples 4 to 6, the evaluation results are shown in a table below. Similarly to the evaluation results of the liquid crystal displays having reflection films inside, with respect to the liquid crystal displays in Examples 6 and 7, in which the thickness of the reflection film was 90 Å and 100 Å, respectively, brightest and easily visible display was obtained, and with respect to the liquid crystal displays in Examples 8 to 10, brightness was slightly low compared to Examples 6 and 7. However, with respect to the liquid crystal display in Example 10 in which the thickness of the reflection film was 300 Å, similar to the liquid crystal display in Example 5, there was a difference in brightness depending on the operation modes, and it was slightly difficult to see the display when the liquid crystal display was used while switching between the transmissive mode and the reflective mode.

In Comparative Examples 4 and 6, brightness was insufficient in the reflective mode and in the transmissive mode, respectively, and also, since the transflectors were provided outside, brightness tended to be more insufficient than the liquid crystal displays having reflection films inside in Comparative Examples 1 and 2. With respect to the liquid crystal display in Comparative Example 6, brightness was insufficient in the transmissive mode, the same as in the Comparative Example 3.

|  | Thickness of Reflection film | Evaluation of Reflection | Evaluation of Transmittance | Comprehensive Evaluation |
|---|---|---|---|---|
| Example 6 | 90 Å | A | A | A |
| Example 7 | 100 Å | A | A | A |
| Example 8 | 150 Å | A | B | B |
| Example 9 | 200 Å | A | B | B |
| Example 10 | 300 Å | A | B | B |
| Comparative Example 4 | 75 Å | C | A | C |
| Comparative Example 5 | 325 Å | A | C | C |
| Comparative Example 6 | 1,000 Å | A | D | D |

In the method in which the degree of brightness was classified according to four levels, although the brightness of the liquid crystal displays having reflection films inside in Example 1 and 2 and the brightness of the liquid crystal displays provided with transflectors on the exterior thereof in Example 6 and 7 evaluated as "A", a brighter display was obtained in the liquid crystal displays wherein light pass through fewer substrates in Examples 1 and 2 compared to the liquid crystal displays in Examples 6 and 7, respectively, both in the reflective mode and in the transmissive mode.

The liquid crystal display in Examples 1 to 10 provided display brightness sufficient for practical use.

What is claimed is:

1. A transflective liquid crystal display comprising:

a pair of substrates which oppose each other with a liquid crystal layer therebetween;

a light source provided on an exterior of one of the substrates; and at least an organic film, a metallic reflection film, an overcoat film, an electrode layer, and an alignment film formed on an inner face of one of the substrates, wherein a plurality of concave portions are contiguously formed on a surface of the organic film, an inner surface of each concave portion constituting a part of a spherical surface, and the metallic reflection film has a thickness of 80 to 500 Å wherein a depth of the concave portions is in the range of 0.1 to 3 $\mu$m, an inclination angle of the inner surface of each concave portion is in the range of −30 degrees to +30 degrees, and a pitch of adjoining concave portions is in the range of 5 to 50 $\mu$m.

2. A transflective liquid crystal display according to claim 1, wherein the reflection film has a thickness of 80 to 100 Å.

* * * * *